United States Patent [19]
Koshiishi

[11] Patent Number: 5,255,312
[45] Date of Patent: Oct. 19, 1993

[54] FACSIMILE MACHINE CONNECTABLE TO VARIOUS COMMUNICATION EQUIPMENTS

[75] Inventor: Takaho Koshiishi, Tokyo, Japan
[73] Assignee: Ricoh Company, Ltd., Tokyo, Japan
[21] Appl. No.: 921,982
[22] Filed: Aug. 3, 1992

Related U.S. Application Data

[63] Continuation of Ser. No. 608,265, Nov. 2, 1990, abandoned.

[30] Foreign Application Priority Data

Nov. 10, 1989 [JP] Japan .................. 1-291073

[51] Int. Cl.$^5$ .................. H04M 11/00; H04N 1/32
[52] U.S. Cl. .................. 379/100; 379/58; 358/442; 358/443
[58] Field of Search .................. 379/100, 96, 98, 97, 379/93, 59, 58; 358/442, 443

[56] References Cited

U.S. PATENT DOCUMENTS

| | | | |
|---|---|---|---|
| 4,837,812 | 7/1989 | Takahashi et al. | 379/100 |
| 4,922,546 | 5/1990 | Takahashi et al. | 379/100 |
| 4,977,609 | 12/1990 | McClure | 379/100 |
| 4,991,201 | 2/1991 | Tseng | 379/100 |

Primary Examiner—Jin F. Ng
Assistant Examiner—Stella L. Woo
Attorney, Agent, or Firm—Oblon, Spivak, McClelland, Maier & Neustadt

[57] ABSTRACT

A facsimile machine which is coupled to a telephone line and a telephone set, where the facsimile machine connects the telephone set to the telephone line in a telephone mode and disconnects the telephone set from the telephone line in a facsimile mode so as to use the telephone line as a communication line for a facsimile communication, and the facsimile machine is connectable to a communication equipment via an interface unit which is designed exclusively for the communication equipment. The facsimile machine includes a single connector including signal lines for receiving and transmitting signals for coupling the facsimile machine to the interface unit, a single switch coupled to the connector for arbitrarily selecting the communication line to the telephone line in a first mode and to the communication equipment in a second mode, and a communication part for making a facsimile communication using the communication line which is selected by the switch.

13 Claims, 6 Drawing Sheets

FACSIMILE MACHINE CONNECTABLE TO VARIOUS COMMUNICATION EQUIPMENTS

This application is a continuation of application Ser. No. 07/608,265, filed on Nov. 2, 1990, now abandoned.

BACKGROUND OF THE INVENTION

The present invention generally relates to facsimile machines, and more particularly to a facsimile machine which is connected to various kinds of communication equipments.

Facsimile machines are not only connected to a general telephone line. Recently, the facsimile machines are also connected to various communication equipments such as a mobile telephone set and a radio transmitter/receiver.

In such cases, the facsimile machine is connected to the communication equipment in the following manner.

According to a first method, connection terminals and interface circuits are provided on the facsimile machine exclusively for connecting the facsimile machine to communication equipments such as a radio transmitter/receiver, a microphone, a radio transmitter/receiver unit of a mobile telephone and a handset.

On the other hand, according to a second method, interface circuits exclusively for connecting the facsimile machine to the communication equipments are connected externally to line terminals and telephone terminals of the facsimile machine, and the facsimile machine is coupled to the communication equipments via the appropriate external interface circuits.

However, according to the first method, the facsimile machine is provided with functions which the user may not necessarily require, and there are problems in that the circuit structure becomes complex due to the numerous interface circuits and that the facsimile machine becomes expensive. In addition, when the facsimile machine is provided with a large number of connection terminals, the user must distinguish those connection terminals which are to be connected to a certain communication equipment from other connection terminals when making the connection, and there is a problem in that this connection operation is troublesome for the user to perform. Furthermore, when the facsimile machine is connected to a plurality of communication equipments, it is necessary to carry out a switching operation to select the communication equipment which is to be used, and there is a problem in that this switching operation is troublesome for the user to perform.

On the other hand, according to the second method, it is necessary to disconnect the telephone set from a telephone line which is used, for example, and reconnect the telephone set to the telephone line after connecting the external interface circuit which is used for connecting the facsimile machine to the telephone set. For this reason, there is a problem in that this connection operation is troublesome for the user to perform.

Therefore, when connecting the facsimile machine to the communication equipment, there conventionally are problems in that the connection operation to connect the facsimile machine to the communication equipment is troublesome for the user to perform, the operation of the facsimile machine is complex and the facsimile machine is expensive.

SUMMARY OF THE INVENTION

Accordingly, it is a general object of the present invention to provide a novel and useful facsimile machine in which the above described problems are overcome.

Another and more specific object of the present invention is to provide a facsimile machine which is coupled to a telephone line and a telephone set, where the facsimile machine connects the telephone set to the telephone line in a telephone mode and disconnects the telephone set from the telephone line in a facsimile mode so as to use the telephone line as a communication line for a facsimile communication, and the facsimile machine is connectable to a communication equipment via an interface unit which is designed exclusively for the communication equipment. The facsimile machine comprises single connector means including signal lines for receiving and transmitting signals for coupling the facsimile machine to the interface unit, single switching means coupled to the connector means for arbitrarily selecting the communication line to the telephone line in a first mode and to the communication equipment in a second mode, and communication means for making a facsimile communication using the communication line which is selected by the switching means. According to the facsimile machine of the present invention, the facsimile machine can be coupled to a desired communication equipment via an interface unit by connecting a single connector of the facsimile machine to a corresponding connector of the interface unit. Hence, it is easy for the user to make the necessary connections and the required connection is simple. Furthermore, the switching of the communication lines is made by simply switching the normally connected telephone line and the externally coupled communication equipment, and the user can carry out the necessary switching with ease.

Other objects and further features of the present invention will be apparent from the following detailed description when read in conjunction with the accompanying drawings.

DESCRIPTION OF THE PREFERRED EMBODIMENTS

Figure 1:
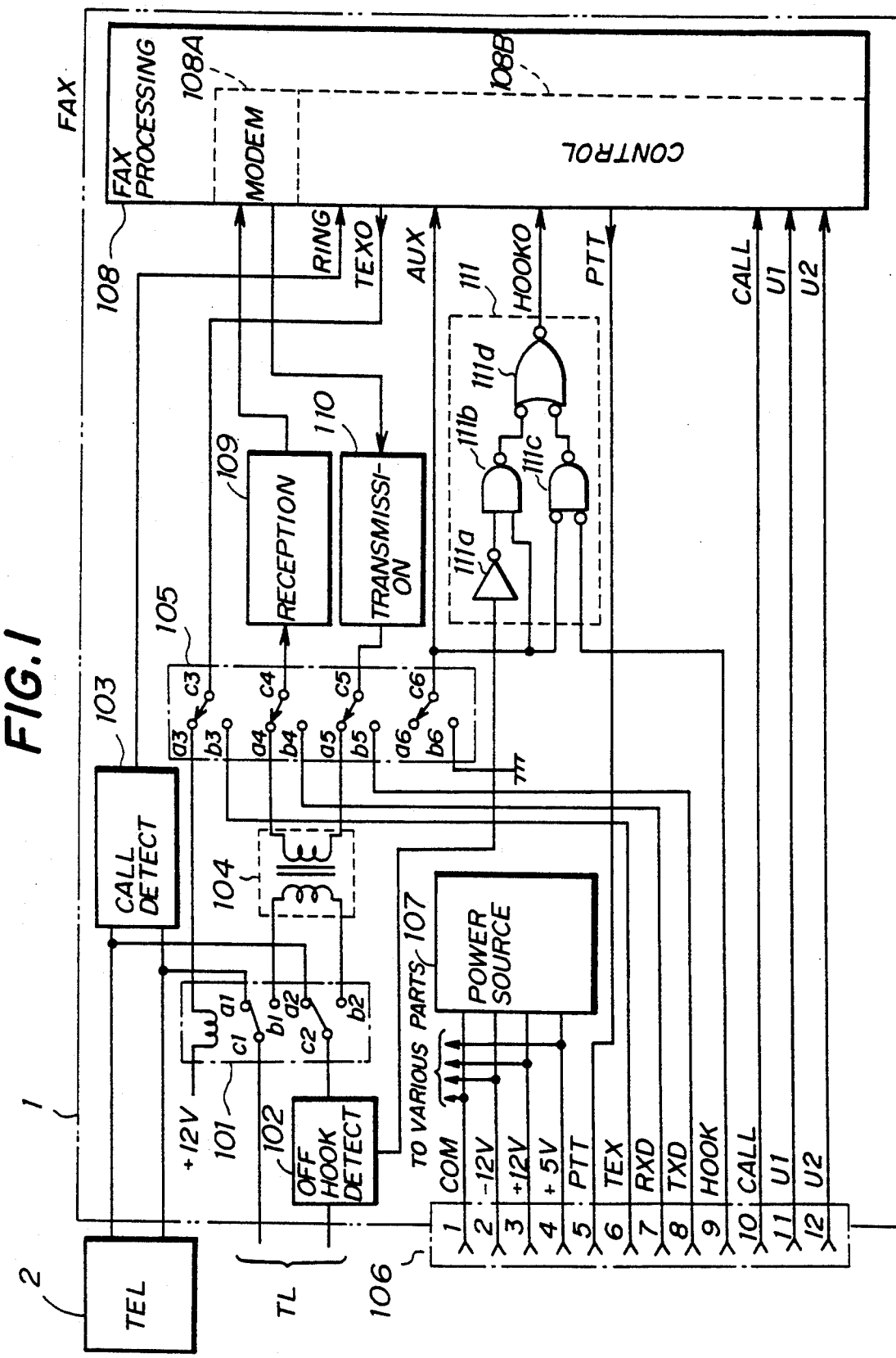
FIG. 1 is a system block diagram showing an essential part of an embodiment of a facsimile machine according to the present invention.

FIG. 1 shows an essential part of an embodiment of a facsimile machine according to the present invention. A facsimile machine 1 is coupled to a telephone line TL and a telephone set 2.

In the facsimile machine 1, one of two lines making up the telephone line TL is connected to a common terminal c1 of a switching circuit which forms a relay 101. The other of the two lines making up the telephone line TL is coupled to a common terminal c2 of another switching circuit which forms the relay 101 via an off hook detection circuit 102 which detects an off hook state. Contacts a1 and a2 of the relay 101 are connected to the telephone set 2 and a call detection circuit 103 which detects a calling signal when called.

Contacts b1 and b2 of the relay 101 are respectively connected to ends of one winding of a transformer 104. One end of a winding of the relay 101 is connected to a positive power source of +12 V, while the other end of this winding is connected to a contact a3 of a switch 105. This switch 105 is switched manually depending on whether a communication is to be made via the telephone line TL or via a communication equipment which is connected to the facsimile machine 1. Contacts a4 and a5 of the switch 105 are respectively connected to ends of another winding of the transformer 104.

A connector 106 is used to couple the facsimile machine 1 to various communication equipments via an interface unit. The connector 106 includes pins "1" through "12". The pin "6" is used for receiving a telephone/facsimile switching signal TEX and is connected to a contact b3 of the switch 105. The pin "7" is used for receiving a reception data signal RXD and is connected to a contact b4 of the switch 105. The pin "8" is used for transmitting a transmission data signal TXD and is connected to a contact b5 of the switch 105.

A power source circuit 107 supplies voltages −12 V, +12 V and +5 V to various parts of the facsimile machine 1 and to the communication equipment which is coupled to the facsimile machine 1. The power source circuit 107 has a ground line COM, and power lines respectively for supplying the voltages −12 V, +12 V and +5 V. The ground line COM is connected to the pin "1" of the connector 106. The power line for supplying −12 V is connected to the pin "2", the power line for supplying +12 V is connected to the pin "3", and the power line for supplying +5 V is connected to the pin "4" of the connector 106.

A facsimile processing part 108 includes a modem 108A and a controller 108B, and carries out processes such as reading a document image, recording a received image and transmitting image information.

A common terminal c4 of the switch 105 is connected to an input side of a reception signal circuit 109. This reception signal circuit 109 amplifies the reception signal and eliminates a signal component in an unwanted band. An output signal of the reception signal circuit 109 is supplied to the modem 108A of the facsimile processing part 108. The transmission signal output from the modem 108A is supplied to a transmission signal circuit 110. The transmission signal circuit 110 eliminates a signal component in an unwanted band and adjusts a transmission level of the signal. An output signal of the transmission signal circuit 110 is supplied to a common terminal c5 of the switch 105.

A call detection signal RING output from the call detection circuit 103 is supplied to the controller 108B of the facsimile processing part 108. The controller 108B supplies a telephone/facsimile switching signal TEX0 to a common terminal c3 of the switch 105. A common terminal c6 of the switch 105 is coupled to the controller 108B via a line which supplies an external unit selection signal AUX to the controller 108B.

A hook signal switching circuit 111 receives a output detection signal of the off hook detection circuit 102 and a hook signal HOOK from the pin "9" of the connector 106, and supplies a hook signal HOOK0 to the controller 108B. This hook signal switching circuit 111 selectively outputs one of the two signals described above as the hook signal HOOK0 depending on the switching state of the switch 105. The hook signal switching circuit 111 includes an inverter 111a, NAND circuits 111b and 111c, and a NOR circuit 111d.

The output detection signal of the off hook detection circuit 102 is supplied to the inverter 111a of the hook signal switching circuit 111. An output signal of the inverter 111a is supplied to one input terminal of the NAND circuit 111b. The other input terminal of the NAND circuit 111b is connected to a common terminal c6 of the switch 105. The common terminal c6 is also connected to an inverting input terminal of the NAND circuit 111c, and the other inverting input terminal of the NAND circuit 111c is connected to the pin "9" of the connector 106. Output signals of the NAND circuits 111b and 111c are supplied to inverting input terminals of the NOR circuit 111d, and an output signal of the NOR circuit 111d is supplied to the controller 108B of the facsimile processing part 108.

The controller 108B of the facsimile processing part 108 supplies a press-to-talk signal PTT to the pin "5" of the connector 106. A calling signal CALL from the communication equipment which is coupled to the facsimile machine 1 and unit identification signals U1 and U2 are supplied to the controller 108B from respective pins "10", "11" and "12" of the connector 106.

In this embodiment, when coupling the communication equipments to the facsimile machine 1, an interface unit designed exclusively for each communication equipment is used.

Figure 2:
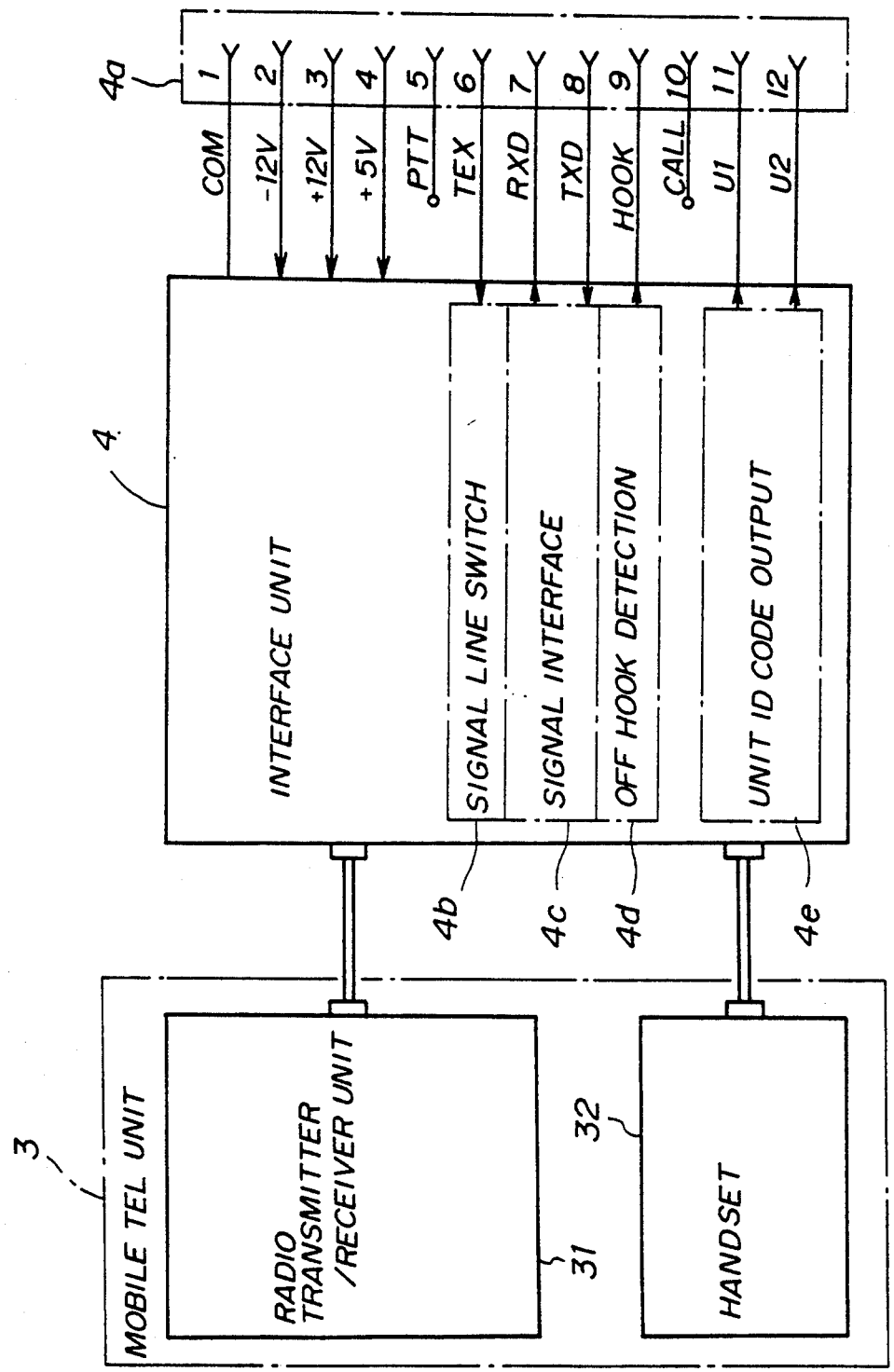
FIG. 2 is a system block diagram for explaining a connection of the facsimile machine to a mobile telephone unit.

FIG. 2 shows a diagram for explaining a case where the facsimile machine 1 is coupled to a mobile telephone unit 3. A radio transmitter/receiver unit 31 and a handset 32 of the mobile telephone unit 3 are coupled to the facsimile machine 1 via an interface unit 4 which is designed exclusively for the mobile telephone unit 3.

A connector 4a is mounted on the interface unit 4, and this connector 4a is connected to the connector 106 of the facsimile machine 1. The power source voltages from the facsimile machine 1 are supplied to the interface unit 4 via pins "1" through "4" of the connector 4a. The interface unit 4 further includes a signal line switching means 4b, a signal interface means 4c, an off hook detection means 4d and a unit identification code output means 4e.

The signal line switching means 4b switches the lines of the radio transmitter/receiver unit 31 for transmission and reception signals between a case where a telephone communication is made via the handset 32 and a case where a facsimile communication is made via the facsimile machine 1. The signal line switching means 4b is controlled by the telephone/facsimile switching signal TEX which is received via a pin "6" of the connector 4a.

The signal interface means 4c supplies the reception data signal RXD to a pin "7" of the connector 4a and receives the transmission data signal TXD from a pin "8" of the connector 4a. In other words, the signal interface means 4c outputs the reception signal from the radio transmitter/receiver unit 31 as the reception data signal RXD with respect to the facsimile machine 1, and outputs the transmission data signal TXD from the facsimile machine 1 as the transmission signal with respect to the mobile telephone unit 3.

The off hook detection means 4d detects the off hook state of the handset 32 and supplies the hook signal HOOK to a pin "9" of the connector 4a.

The unit identification code output means 4e outputs the unit identification signals U1 and U2 to pins "11" and "12" of the connector 4a. The unit identification signals U1 and U2 indicate that the interface unit 4 is designed exclusively for the mobile telephone unit 3.

As may be readily understood from the description given above, the numbers assigned to the pins of the connector 4a of the interface unit 4 respectively correspond to the numbers assigned to the pins of the connector 106 of the facsimile machine 1, and the pins which are assigned the same number are connected. This is the same for connectors of other interface units which will be described later.

Figure 3:
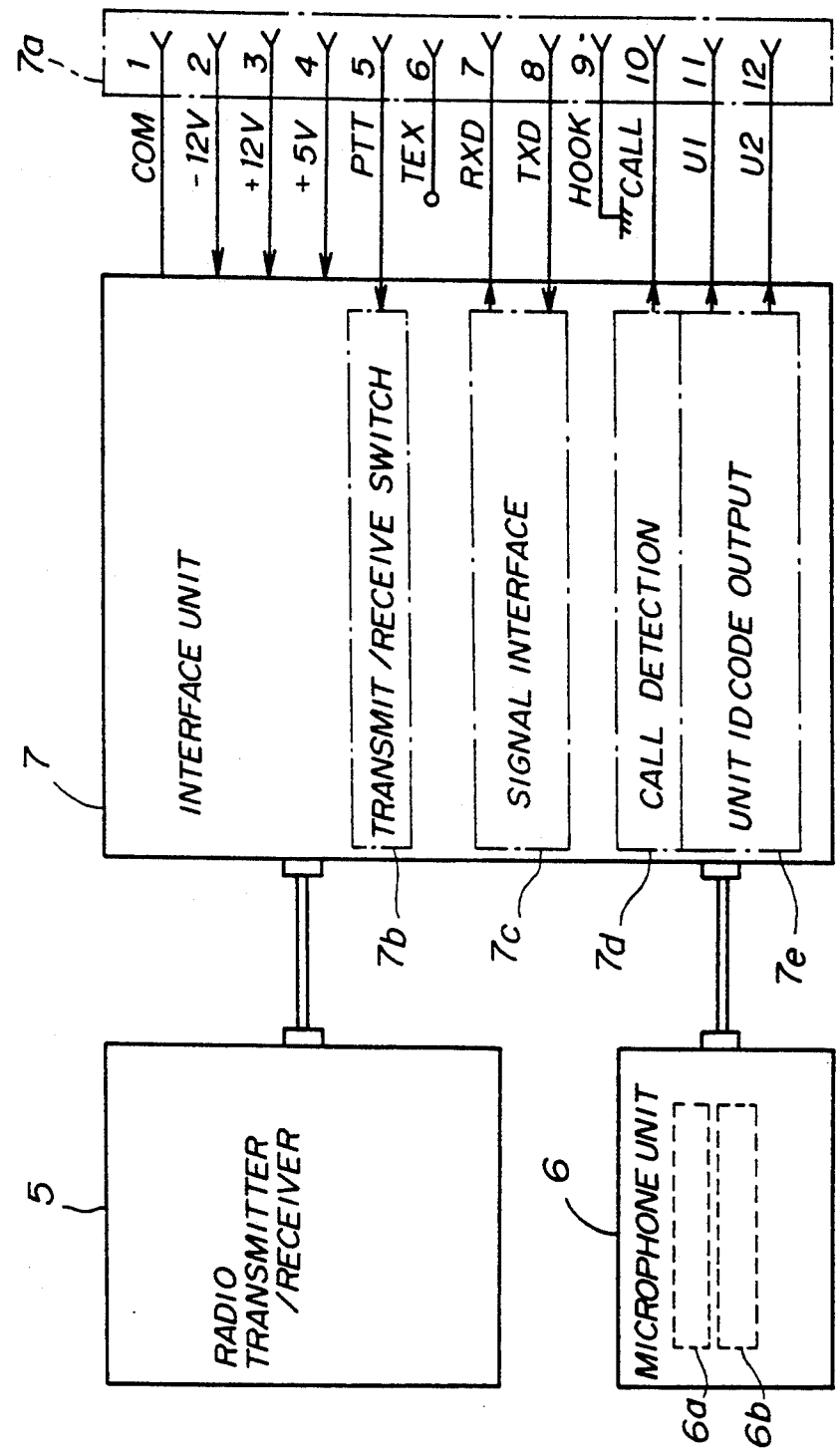
FIG. 3 is a system block diagram for explaining a connection of the facsimile machine to a radio transmitter/receiver.

FIG. 3 shows a diagram for explaining a case where the facsimile machine 1 is coupled to a radio transmitter/receiver 5. The radio transmitter/receiver 5 and a microphone unit 6 are coupled to the facsimile machine 1 via an interface unit 7 which is designed exclusively for the radio transmitter/receiver 5. The microphone unit 6 includes a microphone 6a and a press-to-talk switch 6b.

A connector 7a is mounted on the interface unit 7, and this connector 7a is connected to the connector 106 of the facsimile machine 1. The power source voltages from the facsimile machine 1 are supplied to the interface unit 7 via pins "1" through "4" of the connector 7a. The interface unit 7 further includes a transmission/reception switching means 7b, a signal interface means 7c, a call detection means 7d and a unit identification code output means 7e.

The transmission/reception switching means 7b switches the lines of the radio transmitter/receiver 5 between transmission and reception modes. The transmission/reception switching means 7b is controlled by the press-to-talk signal PTT which is received via a pin "5" of the connector 7a.

The signal interface means 7c supplies the reception data signal RXD to a pin "7" of the connector 7a and receives the transmission data signal TXD from a pin "8" of the connector 7a. In other words, the signal interface means 7c outputs the reception signal from the radio transmitter/receiver 5 as the reception data signal RXD with respect to the facsimile machine 1, and outputs the transmission data signal TXD from the facsimile machine 1 as the transmission signal with respect to the radio transmitter/receiver 5.

The call detection means 7d supplies the calling signal CALL to a pin "10" of the connector 7a when the radio transmitter/receiver 5 is called from another radio transmitter/receiver unit (not shown).

The unit identification code output means 7e outputs the unit identification signals U1 and U2 to pins "11" and "12" of the connector 7a. The unit identification signals U1 and U2 indicate that the interface unit 7 is designed exclusively for the radio transmitter/receiver 5.

Figure 4:
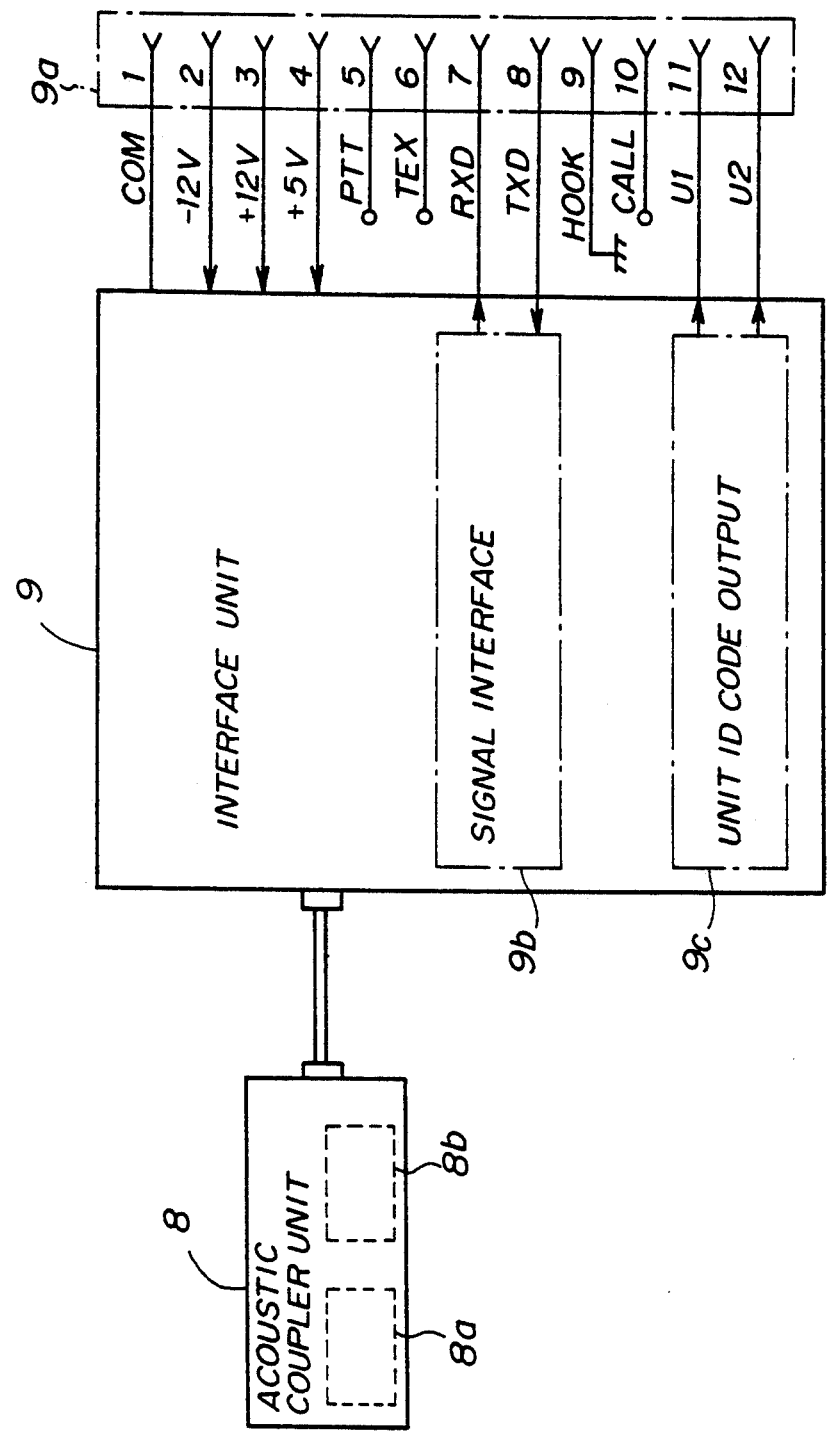
FIG. 4 is a system block diagram for explaining a connection of the facsimile machine to an acoustic coupler unit.

FIG. 4 shows a diagram for explaining a case where the facsimile machine 1 is coupled to an acoustic coupler unit 8. The acoustic coupler unit 8 is coupled to the facsimile machine 1 via an interface unit 9 which is designed exclusively for the acoustic coupler unit 8. The acoustic coupler unit 8 includes a speaker 8a which couples to a transmitter of a telephone and a microphone 8b which couples to a receiver of the telephone.

A connector 9a is mounted on the interface unit 9, and this connector 9a is connected to the connector 106 of the facsimile machine 1. The power source voltages from the facsimile machine 1 are supplied to the interface unit 9 via pins "1" through "4" of the connector 9a. The interface unit 9 further includes a signal interface means 9b and a unit identification code output means 9c.

The signal interface means 9b supplies the reception data signal RXD to a pin "7" of the connector 9a and receives the transmission data signal TXD from a pin "8" of the connector 9a. In other words, the signal interface means 9b outputs the reception signal from the acoustic coupler unit 8 as the reception data signal RXD with respect to the facsimile machine 1, and outputs the transmission data signal TXD from the facsimile machine 1 as the transmission signal with respect to the acoustic coupler unit 8.

The unit identification code output means 9c outputs the unit identification signals U1 and U2 to pins "11" and "12" of the connector 9a. The unit identification signals U1 and U2 indicate that the interface unit 9 is designed exclusively for the acoustic coupler unit 8.

Figure 5:
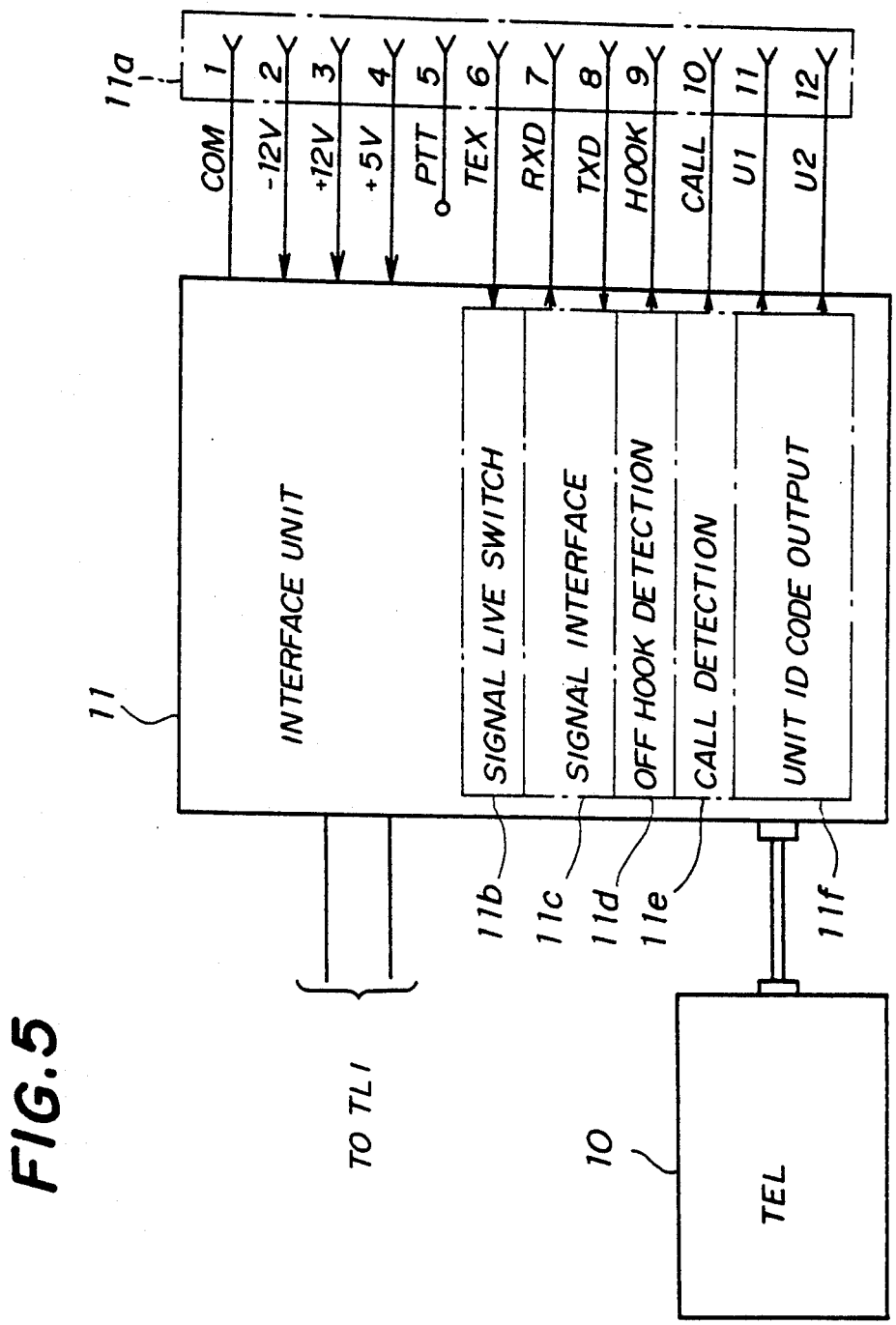
FIG. 5 is a system block diagram for explaining a connection of the facsimile machine to other telephone lines.

FIG. 5 shows a diagram for explaining a case where the facsimile machine 1 is coupled to other telephone lines. A telephone line TL1 and a telephone set 10 are coupled to the facsimile machine 1 via an interface unit 11. This interface unit 11 is designed exclusively for connection to the telephone line TL1.

A connector 11a is mounted on the interface unit 11, and this connector 11a is connected to the connector 106 of the facsimile machine 1. The power source voltages from the facsimile machine 1 are supplied to the interface unit 11 via pins "1" through "4" of the connector 11a. The interface unit 11 further includes a signal line switching means 11b, a signal interface means 11c, an off hook detection means 11d, a call detection means 11e and a unit identification code output means 11f.

The signal line switching means 11b switches the lines for transmission and reception signals between a case where a telephone communication is made via the telephone set 10 and a case where a facsimile communication is made via the facsimile machine 1. The signal line switching means 11b is controlled by the telephone/facsimile switching signal TEX which is received via a pin "6" of the connector 11a.

The signal interface means 11c supplies the reception data signal RXD to a pin "7" of the connector 11a and receives the transmission data signal TXD from a pin "8" of the connector 11a. In other words, the signal interface means 11c outputs the reception signal from the telephone line TL1 as the reception data signal RXD with respect to the facsimile machine 1, and outputs the transmission data signal TXD from the facsimile machine 1 as the transmission signal with respect to the telephone line TL1.

The off hook detection means 11d detects the off hook state of the telephone set 10 and supplies the hook signal HOOK to a pin "9" of the connector 11a.

The call detection means 11e supplies the calling signal CALL to a pin "10" of the connector 11a when a call is received from the telephone line TL1.

The unit identification code output means 11f outputs the unit identification signals U1 and U2 to pins "11" and "12" of the connector 11a. The unit identification signals U1 and U2 indicate that the interface unit 11 is designed exclusively for connection to the telephone line TL1.

Figure 6:
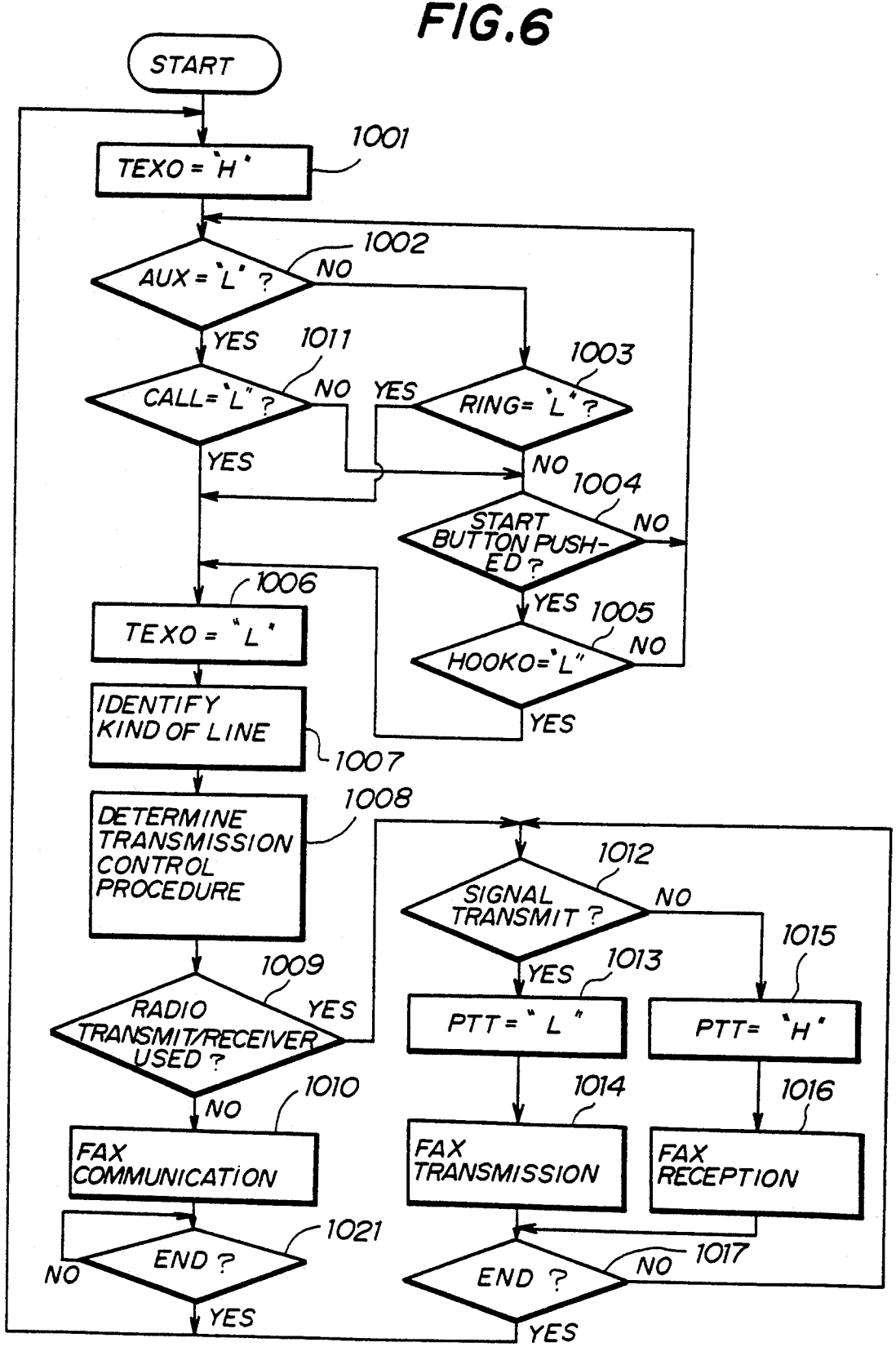
FIG. 6 is a flow chart for explaining a communication operation of the embodiment.

Next, a description will be given of the operation of the facsimile machine 1 when a facsimile communication is made using the telephone line TL which is connected to the facsimile machine 1, by referring to FIG. 6. FIG. 6 is a flow chart showing the basic operation of the controller 108B of the facsimile processing part 108.

In this case, the user switches the switch 105 to connect to the side of the contacts a3 through a6, so as to turn on the power source for the facsimile machine 1.

When the power source of the facsimile machine 1 is turned ON, a step 1001 shown in FIG. 6 sets the telephone/facsimile switching signal TEX0 to a high ("H") level. As a result, the relay 101 turns OFF and the movable contacts of the switching circuits of the relay 101 are respectively connected to the side of the contacts a1 and a2, and the telephone set 2 is connected to the telephone line TL. Then, a step 1002 judges whether or not the external unit selection signal AUX has a low ("L") level. In this case, the signal line for the external unit selection signal AUX is open by the switch 105 and the external unit selection signal AUX has a high level. In other words, the judgement result in the step 1002 is NO, and the process advances to a step 1003.

The step 1003 judges whether or not the call detection signal RING has a low level. When no call is received, this call detection signal RING has a high level. Hence, in this case, the judgement result in the step 1003 is NO and a step 1004 judges whether or not a start button (not shown) is pushed. The start button is provided on an operation panel (not shown) of the facsimile machine 1 and instructs a start of the facsimile communication. When the judgement result in the step 1004 is NO, the process returns to the step 1002.

When the user wishes to make the facsimile communication, the user calls a destination facsimile machine from the telephone set 2 and pushes the start button when the destination facsimile machine answers.

On the other hand, when the judgement result in the step 1004 is YES, a step 1005 judges whether or not the hook signal HOOK0 has a low level. The process returns to the step 1002 when the judgement result in the step 1005 is NO. When the telephone set 2 is in the off hook state, the off hook detection circuit 102 outputs a low-level detection signal. Further, in this case, the common terminal c6 of the switch 105 is connected to the contact a6, and one input signal to the NAND circuit 111b and one inverted input signal to the NAND circuit 111c respectively have a high level. For this reason, the output detection signal of the off hook detection circuit 102 is supplied to the controller 108B as the hook signal HOOK0 via the inverter 111a, the NAND circuit 111b and the NOR circuit 111d.

When the judgement result in the step 1005 is YES, a step 1006 sets the telephone/facsimile switching signal TEX0 to the low level. Hence, a current is supplied to the winding of the relay 101 and the switching circuits of the relay 101 are switched to the side of the contacts b1 and b2. Accordingly, the reception signal from the telephone line TL is supplied to the modem 108A of the facsimile processing part 108 via the relay 101, the transformer 104, the switch 105 and the reception signal circuit 109. The output signal of the modem 108A is supplied to the telephone line TL via the transmission signal circuit 110, the switch 105, the transformer 104 and the relay 101.

In this embodiment, the facsimile machine 1 may be coupled to a radio line instead of the telephone line TL. However, the radio lines of the mobile telephone and the radio transmitter/receiver are not necessarily capable of providing a communication of a high quality. For this reason, this embodiment carries out the facsimile communication with a transmission control procedure dependent on the communication quality of the line in use.

A step 1007 identifies the kind of line in use. In this case, the external unit selection signal AUX has the high level and the step 1007 identifies the line as the general telephone line. A step 1008 determines the transmission control procedure which is to be used depending on the identified line. In this case, the step 1008 selects the transmission control procedure to the error correction mode of the Group III Mode in conformance with the CCITT Recommendations, for example.

Next, a step 1009 judges whether or not a radio transmitter/receiver is used. When the judgement result in the step 1009 is NO, a step 1010 carries out a facsimile communication by transmitting and receiving facsimile signals at the modem 108A with the transmission control procedure determined by the step 1008. Then, a step 1021 judges whether or not the facsimile communication is ended. The process returns to the step 1001 when the judgement result in the step 1021 becomes YES. Hence, the facsimile machine 1 resumes the initial state in which the switching circuits of the relay 101 are connected to the side of the contacts a1 and a2.

Next, a description will be given of a case where a call is received on the telephone line TL. In this case, the call detection circuit 103 detects the calling signal from the telephone line TL and sets the call detection signal RING to the low level.

When the judgement result in the step 1003 becomes YES, the process advances to the step 1006. Hence, the relay 101 is switched and the facsimile communication is carried out similarly as described above.

On the other hand, when making the facsimile communication using other communication equipments such as a mobile telephone, the user connects the facsimile machine 1 to an appropriate one of the interface units 4, 7, 9 and 11 respectively shown in FIGS. 2, 3, 4 and 5. The connector of the appropriate interface unit is connected to the connector 106 of the facsimile machine 1. In addition, the switch 105 is connected to the side of the contacts b3 through b6.

For the sake of convenience, it is assumed that the mobile telephone 3 shown in FIG. 2 is coupled to the facsimile machine 1. In this case, the interface unit 4 transmits and receives signals between the radio transmitter/receiver unit 31 and the handset 32 when the facsimile machine 1 is in a standby mode, and the user can make and receive a call in a normal manner.

When the switch 105 is switched to the side of the contacts b3 through b6 in the facsimile machine 1, the level of the external unit selection signal AUX becomes low. Hence, the judgement result in the step 1002 is YES, and a step 1011 judges whether or not the calling signal CALL has a low level. In the interface unit 4, the call signal CALL is not supplied to the pin "10" of the counter 4a and the signal level at the pin "10" of the connector 4a is high. Thus, the judgement result in the step 1011 is NO and the process advances to the step 1004. The step 1004 judges whether or not the start button of the facsimile machine is pushed, and the process returns to the step 1002 when the judgement result in the step 1004 is NO.

When the user makes a facsimile communication, the handset 32 is manipulated to call the destination facsimile machine and the start button of the facsimile 1 is pushed when the destination facsimile machine answers. In this case, the judgement result in the step 1004 is YES, and the step 1005 judges whether or not the hook signal HOOK0 has the low level.

When the handset 32 is in the off hook state, the interface unit 4 outputs a low-level hook signal HOOK. This low-level hook signal HOOK is supplied to one inverting input terminal of the NAND circuit 111c of the hook signal switching circuit 111 within the facsimile machine 1. In this case, both inverting input terminals of the NAND circuit 111c receives a low-level signal, and the hook signal switching circuit 111 outputs the hook signal HOOK as the hook signal HOOK0.

When the judgement result in the step 1005 is YES, the step 1006 sets the telephone/facsimile switching signal TEX0 to the low level. In this case, the telephone/facsimile switching signal TEX0 is supplied to the interface unit 4 as the telephone/facsimile switching signal TEX. In addition, the transmission and reception signals at the modem 108A are respectively switched at the switch 105 and received from and transmitted to the interface unit 4 as the transmission data signal TXD and the reception data signal RXD. When the telephone/facsimile switching signal TEX has the low level, the interface unit 4 outputs the transmission data signal TXD which is received from the facsimile machine 1 to the mobile telephone unit 3 and outputs the reception signal from the mobile telephone unit 3 as the reception data signal RXD to the facsimile machine 1.

Next, the step 1007 identifies that the mobile telephone unit 3 is connected from the unit identification signals U1 and U2 output from the unit identification code output means 4e of the interface unit 4. Since the communication quality of the mobile telephone line is relatively poor, the step 1008 determines the transmission control procedure accordingly. For example, the transmission control procedure is set for the mobile telephone so that the maximum number of retransmissions of the image information is reduced in the error correction mode and the data transmission rate is reduced at the start of the facsimile transmission.

Since the radio transmitter/receiver is not used, the judgement result in the step 1009 is NO and the step 1010 carries out the facsimile communication in conformance with the transmission control procedure determined in the step 1008. When the judgement result in the step 1021 becomes YES, the mobile telephone unit 3 resumes the state where a call can be made from the handset 32, and the process returns to the step 1001 so that the facsimile machine 1 resumes the initial standby mode.

Next, a description will be given of the case where the radio transmitter/receiver 5 and the microphone unit 6 shown in FIG. 3 are coupled to the facsimile machine 1. In this case, the interface unit 7 transmits and receives signals between the radio transmitter/receiver 5 and the microphone unit 6 when the facsimile machine 1 is in a standby mode, and the user can make a radio communication in a normal manner.

Similarly as in the case described above, the judgement result in the step 1002 is YES, and the step 1011 judges whether or not the calling signal CALL has a low level. The interface unit 7 sets the call signal CALL to the low level when the radio transmitter/receiver 5 receives a call from another radio transmitter/receiver (not shown).

When the judgement result in the step 1011 is NO, the step 1004 judges whether or not the start button of the facsimile machine is pushed, and the process returns to the step 1002 when the judgement result in the step 1004 is NO.

When the user makes a facsimile communication, the start button of the facsimile 1 is pushed when the destination facsimile machine answers.

In the facsimile machine 1, when the judgement result in the step 1004 is YES, the step 1005 judges whether or not the hook signal HOOK0 has the low level. In this case, the pin "9" of the connector 7a is grounded and the hook signal HOOK has the low level. Hence, similarly as in the above described case, the hook signal HOOK0 also has the low level. Hence, the judgement result in the step 1005 is YES, and the step 1006 sets the telephone/facsimile switching signal TEX0 to the low level. In this case, the telephone/facsimile switching signal TEX is not supplied to the interface unit 7. On the other hand, the transmission and reception signals at the modem 108A are respectively switched at the switch 105 and received from and transmitted to the interface unit 7 as the transmission data signal TXD and the reception data signal RXD.

Next, the signal 1007 identifies that the radio transmitter/receiver 5 is connected from the unit identification signals U1 and U2 output from the unit identification code output means 7e of the interface unit 7. Since the communication quality of the radio communication line is even poorer than that of the radio telephone line, the step 1008 determines the transmission control procedure accordingly. For example, the transmission control procedure is set for the radio communication to the Group III Mode in conformance with the CCITT Recommendations and having no error correction mode.

Since the radio transmitter/receiver is used, the judgement result in the step 1009 is YES. Hence a step 1012 judges whether or not the facsimile signal is transmitted. When the judgement result in the step 1012 is YES, a step 1013 sets the press-to-talk signal PTT to a low level and a step 1014 transmits a predetermined facsimile signal from the modem 108A. On the other hand, when the facsimile signal is received, the judgement result in the step 1012 is NO. In this case, a step 1015 sets the press-to-talk signal PTT to a high level, and a step 1016 receives a facsimile signal at the modem 108A.

In this case, the interface unit 7 controls the radio transmitter/receiver 5 to a transmitting state when the press-to-talk signal PTT has the low level and transmits the transmission data signal TXD. On the other hand, the interface unit 7 controls the radio transmitter/receiver 5 to a receiving state when the press-to-talk signal PTT has the high level and outputs the reception data signal RXD to the facsimile machine 1. Hence, the step 1010 carries out the facsimile communication and the process returns to the step 1001, that is, the initial standby mode, when the judgement result in the step 1021 becomes YES.

On the other hand, when the radio transmitter/receiver 5 is called from another radio transmitter/receiver, the level of the calling signal CALL becomes low. Hence, the judgement result in the step 1011 is YES in this case, and the process advances to the step 1006 to automatically carry out an operation similar to that described above.

Next, a description will be given of the case where the acoustic coupler unit 8 shown in FIG. 4 is coupled to the facsimile machine 1.

The user makes a facsimile communication in the following manner. That is, when the destination facsimile machine is called from the telephone set and the destination facsimile machine answers, the acoustic coupler unit 8 is connected to the handset of the telephone set and start button of the facsimile 1 is pushed.

In the facsimile machine 1, when the judgement result in the step 1004 is YES, the step 1005 judges whether or not the hook signal HOOK0 has the low level. In this case, the pin "9" of the connector 9a is grounded and the hook signal HOOK has the low level. Hence, similarly as in the above described case, the hook signal HOOK0 also has the low level. Hence, the judgement result in the step 1005 is YES, and the step 1006 sets the telephone/facsimile switching signal TEX0 to the low level. In this case, the telephone/facsimile switching signal TEX is not supplied to the interface unit 9. On the other hand, the transmission and reception signals at the modem 108A are respectively switched at the switch 105 and received from and transmitted to the interface unit 9 as the transmission data signal TXD and the reception data signal RXD.

Next, the step 1007 identifies that the acoustic coupler unit 8 is connected from the unit identification signals U1 and U2 output from the unit identification code output means 9c of the interface unit 9. The step 1008 determines the transmission control procedure according to the acoustic coupler unit 8, and the step 1010 carries out the predetermined facsimile communication in conformance with the transmission control procedure determined in the step 1008 because the judgement result in the step 1009 is NO. The process returns to the step 1001 and the facsimile machine 1 resumes the initial standby mode when the judgement result in the step 1021 becomes YES.

Next, a description will be given of the case where the other telephone line TL1 is coupled to the facsimile machine 1. In this case, the interface unit 11 shown in FIG. 5 couples the telephone line TL1 to the telephone set 10 in the standby mode of the facsimile machine 1.

When the user makes a facsimile communication, the destination facsimile machine is called from the telephone set 10 by carrying out a calling operation. The start button of the facsimile machine 1 is pushed when the destination facsimile machine answers.

When the start button of the facsimile machine 1 is pushed and the judgement result in the step 1004 becomes YES, the step 1005 judges whether or not the hook signal HOOK0 has the low level. When the telephone set 10 is in the off hook state, the interface unit 11 outputs a low-level hook signal HOOK, and the hook signal HOOK0 also has the low level as described above.

When the judgement result in the step 1005 is YES, the step 1006 sets the telephone/facsimile switching signal TEX0 to the low level. When the telephone/facsimile switching signal TEX0 has the low level, the interface unit 11 disconnects the telephone set 10 and transmits the transmission data signal TXD and receives the reception data signal RXD to and from the telephone line TL1.

The step 1007 identifies that the other telephone line TL1 is connected from the unit identification signals U1 and U2 output from the unit identification code output means 11f of the interface unit 11. The step 1008 determines the transmission control procedure according to the telephone line TL1, and the step 1010 carries out the predetermined facsimile communication in conformance with the transmission control procedure determined in the step 1008 because the judgement result in the step 1009 is NO. For example, the transmission control procedure is set to the Group III Mode in conformance with the CCITT Recommendations using the error correction mode. The process returns to the step 1001 and the facsimile machine 1 resumes the initial standby mode in which the telephone set 10 is connected to the telephone line TL when the judgement result in the step 1021 becomes YES.

When a call is received on the telephone line TL1, the interface unit 11 outputs a low-level calling signal CALL. In this case, the judgement result in the step 1011 becomes YES and the process advances to the step 1006 to automatically carry out the predetermined facsimile communication described above.

In this embodiment, the facsimile machine itself does not include the interface circuits for realizing connections to the various communication equipments. When using a particular communication equipment, the user simply needs to prepare an interface unit designed exclusively for the particular communication equipment. In other words, unnecessary functions and circuits are not provided in the facsimile machine or connected externally to the facsimile machine. Therefore, it is possible to minimize the cost of the facsimile machine.

In addition, the facsimile machine can be coupled to a desired communication equipment via an interface unit by connecting a single connector of the facsimile machine to a corresponding connector of the interface unit. Hence, it is easy for the user to make the necessary connections and the required connection is simple. Furthermore, the switching of the communication lines is made by simply switching the normally connected telephone line and the externally coupled communication equipment, and the user can carry out the necessary switching with ease.

Moreover, the connector of the facsimile machine receives from the interface unit the reception data signal RXD, the hook signal HOOK, the unit identification signals U1 and U2, and the calling signal CALL, and supplies to the interface unit the various power source voltages, the transmission data signal TXD and the press-to-talk signal PTT. Since the various signals lines are connected by the single connector of the facsimile machine, it is possible to realize efficient communication operations such as automatic reception and switching of the communication procedure depending on the transmission quality of the communication line.

The switching of the output detection of the off hook detection circuit 102 and the hook signal HOOK from the externally coupled communication equipment is carried out in the hook signal switching circuit 111 which is made up of gates. By this switching operation of the hook signal switching circuit 111, the switch 105 only requires four switching circuits. Further, the unused elements of an integrated circuit (IC) which is used for other circuits of the facsimile machine 1 may be used as the gates of the hook signal switching circuit 111, and the increase in circuit cost and complexity is effectively suppressed. In addition, a switch having four switching circuits is inexpensive compared to a switch having five or more switching circuits, and both the size and cost of the facsimile machine 1 can be minimized.

In the described embodiment, the facsimile machine is provided with the connector which connects to the corresponding connector of the interface unit. However, other connecting means may be employed such as connection terminals.

Further, the present invention is not limited to these embodiments, but various variations and modifications may be made without departing from the scope of the present invention.

What is claimed is:

1. A facsimile machine which is coupled to a telephone line and a telephone set, said facsimile machine connecting the telephone set to the telephone line in a telephone mode and disconnecting the telephone set from the telephone line in a facsimile mode so as to use the telephone line as a communication line for a facsimile communication, said facsimile machine being connectable to a plurality of types of communication equipment via respective interface units which are designed exclusively for a corresponding one of the plurality of types of communication equipment and each using a predetermined set of signals, each of said interface units being provided with a respective signal converter, said facsimile machine comprising:

single connector means including signal lines for receiving and transmitting said predetermined set of signals for coupling the facsimile machine to each of the respective interface units;

control means, connected to said single connector means through said signal lines, for controlling an operation of said facsimile machine;

single switching means coupled to said connector means for arbitrarily selecting the communication line to the telephone line in a first mode and to one of the types of the communication equipment in a second mode; and communication means for making a facsimile communication using the communication line which is selected by said switching means.

2. The facsimile machine as claimed in claim 1, which further comprises processing means for receiving from one of the interface units via said connector means a reception data signal, a hook signal indicative of whether or not a handset of the communication equipment is in a hooked state when the communication equipment is equipped with the handset, identification signals for identifying a kind of the communication equipment which is coupled to the facsimile machine, and a calling signal indicative of whether or not the communication equipment is called via the communication line, and for supplying to the one interface unit via said connector means power source voltages, a transmission data signal, and a control signal for switching the communication equipment between a transmitting mode and a receiving mode when the communication equipment is a radio transmitter/receiver.

3. The facsimile machine as claimed in claim 2, which further comprises hook signal switching means for detecting whether or not the telephone set is in a hooked state when said switching means is in the first mode and for detecting whether or not the communication equipment is in the hooked state based on the hook signal when said switching means is in the second mode.

4. The facsimile machine as claimed in claim 3, wherein said hook signal switching means is made up solely of a logic circuit.

5. The facsimile machine as claimed in claim 1, which further comprises hook signal switching means for detecting whether or not the telephone set is in a hooked state when said switching means is in the first mode and for detecting whether or not the communication equipment is in a hooked state based on a hook signal when said switching means is in the second mode, said hook signal being received from the interface unit via said connector means and indicative of whether or not a handset of the communication equipment is in a hooked state when the communication equipment is equipped with the handset.

6. The facsimile machine as claimed in claim 5, wherein said hook signal switching means is made up solely of a logic circuit.

7. The facsimile machine as claimed in claim 1, wherein the communication equipment is selected from a group consisting of a mobile telephone unit, a radio transmitter/receiver, an acoustic coupler unit, and another telephone set.

8. The facsimile machine as claimed in claim 1, which further comprises identifying means for identifying a kind of communication equipment which is coupled to the facsimile machine based on unit identification signals received from one of the interface units via said connector means, and determining means for determining a transmission control procedure of the facsimile communication based on a result of identification made in said identifying means.

9. The facsimile machine as claimed in claim 1, wherein each of the interface units includes a first connector having a plurality of terminals, and said connector means includes a second connector having a plurality of terminals respectively corresponding to the terminals of the first connector for transmitting and receiving signals between one of the interface units and the facsimile machine when the first and second connectors are connected.

10. The facsimile machine as claimed in claim 9, wherein said first connector has a fixed number of terminals independent of the communication equipment which is coupled to the facsimile machine.

11. The facsimile machine as claimed in claim 1, wherein said single connector means includes second signal lines for receiving and transmitting signals from one of said interface units identifying a communication equipment which is attached to said one interface unit.

12. The facsimile machine as claimed in claim 11, further comprising means for selecting a transmission control procedure based upon said identified communication equipment attached to said one interface unit.

13. The facsimile machine as claimed in claim 1, wherein said connector means comprises a single connector having a predetermined number of interconnections respectively corresponding to said predetermined set of signals;

wherein each of said interface units includes a matching connector adapted to be connected to said single connector means, the matching connector being identical for each of said interface units.

* * * * *